United States Patent
Jones, Jr.

[15] 3,652,438

[45] Mar. 28, 1972

[54] PHOTOELECTROPHORETIC IMAGING PROCESS USING DIVALENT HEAVY METAL SALTS OF 1(1'-SULFO-2-NAPHTHYLAZO)-Z-NAPHTHOLS AS IMAGING MATERIAL

[72] Inventor: Freeman B. Jones, Jr., East Lansing, Mich.

[73] Assignee: Xerox Corporation, Rochester, N.Y.

[22] Filed: May 21, 1970

[21] Appl. No.: 48,595

Related U.S. Application Data

[62] Division of Ser. No. 613,295, Feb. 1, 1967, Pat. No. 3,574,182.

[52] U.S. Cl. .....................204/181, 96/1, 96/1.3, 96/1.5, 96/88
[51] Int. Cl. .....................G03g 13/22, B01k 5/02
[58] Field of Search ..................96/1, 1.5, 88, 1.3; 204/181; 260/195

[56] References Cited

UNITED STATES PATENTS

| | | | |
|---|---|---|---|
| 2,478,768 | 8/1949 | Locke | 260/195 X |
| 2,601,469 | 6/1952 | Tulleson et al. | 260/195 |
| 2,601,668 | 6/1952 | Tulleson | 260/195 |
| 2,867,613 | 1/1959 | Spencer | 260/195 X |
| 2,956,879 | 10/1960 | Van Gampes | 260/195 |
| 3,384,565 | 5/1968 | Tulagon et al. | 96/1 X |
| 3,485,633 | 12/1969 | Tulagin et al. | 96/1 X |

*Primary Examiner*—George F. Lesmes
*Assistant Examiner*—R. E. Martin
*Attorney*—Stanley Y. Cole and James J. Ralabate

[57] ABSTRACT

New compositions consisting of a group of metal salts of 1(1'-sulfo-20'-naphthalazo)-2-naphthols. Also, photoelectrophoretic imaging processes using these compositions are described.

11 Claims, 1 Drawing Figure

PATENTED MAR 28 1972
3,652,438
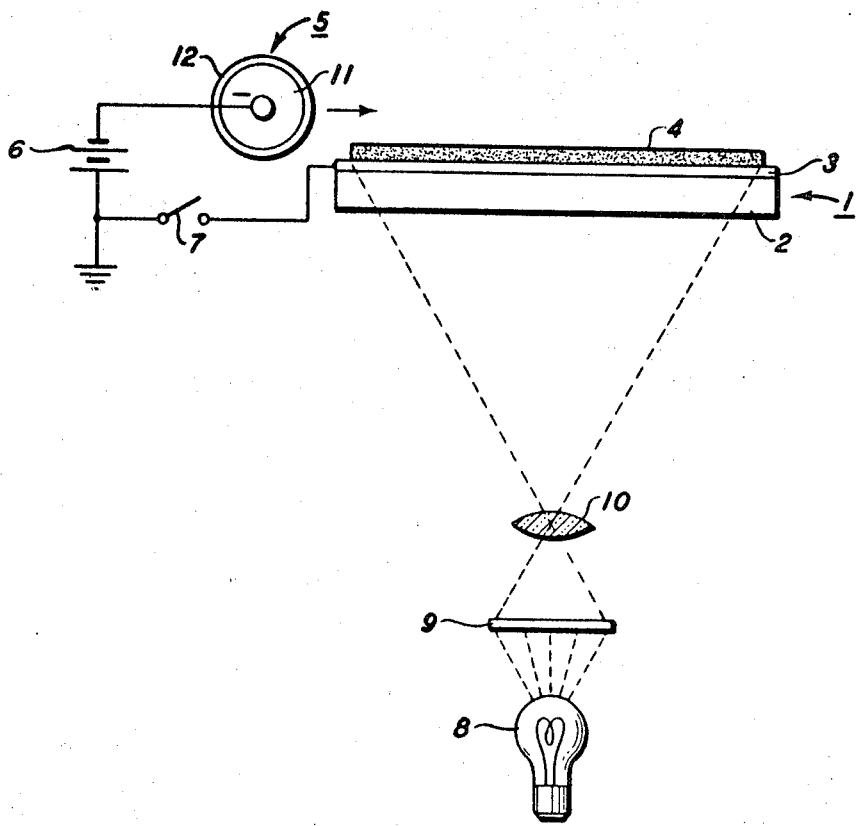
INVENTOR
FREEMAN B. JONES, JR.
BY *Richard A. Tomlin*
ATTORNEY

PHOTOELECTROPHORETIC IMAGING PROCESS USING DIVALENT HEAVY METAL SALTS OF 1(1'-SULFO-2-NAPHTHYLAZO)-2-NAPHTHOLS AS IMAGING MATERIAL

This is a division of application Ser. No. 613,295, filed in the U.S., Feb. 1, 1967, now U.S. Pat. No. 3,574,182.

This invention relates to new compositions and to their manufacture and use. It is particularly directed to new pigments which are especially useful as electrically photosensitive pigments in electrophoretic imaging systems.

BACKGROUND OF THE INVENTION

Many pigments, both organic and inorganic, are known and used in the prior art. While the known pigments are generally useful, the individual pigments generally have different specific undesirable characteristics. Inorganic pigments, as a class, generally exhibit high resistance to light, water, alcohol, and oils, but have poor dispersing properties. Organic pigments, while generally higher in cost and lower in resistance to degrading influences, generally have dispersing and working characteristics and color qualities superior to inorganic pigments. A great many organic pigments are known. The following pigments are typical. Anthracene pigments are generally very resistive to the influence of light, heat, acids and alkalies, but they tend to bleed in alcohol and are expensive. Triphenylmethane dyestuffs have brilliant, clean colors, but are very unstable. They often bleed in water and alcohol and have low resistance to acids and alkalies. Indanthrene pigments lack brilliance and tinctorial strength, but are among the most permanent pigments known. Toluidine pigments have high light resistance but only fair resistance to acids and alkalies. These pigments may bleed in oil. Rhodamine pigments have brilliant clean colors but generally low resistance to degrading influences.

As is apparent from the above discussion, most pigments have both desirable and undesirable characteristics. Thus, there is a continuing need for improved pigments having good resistance to degradation, good dispersing characteristics and brilliant, clean colors.

There has been recently developed an electrophoretic imaging system capable of producing color images which has an especially acute need for pigments having both clean, pure colors, and electrical photosensitivity. This process is described in detail and claimed in copending applications Ser. Nos. 384,737, now U.S. Pat. No. 3,384,565; 384,681, now abandoned, and 384,680, now abandoned, all filed July 23, 1964. In such an imaging system, various colored light absorbing particles are suspended in a nonconductive liquid carrier. The suspension is placed between electrodes, subjected to a potential difference and exposed to an image. As these steps are completed, selective particle migration takes place in image configuration, providing a visible image at one or both of the electrodes. An essential component of the system is the suspended particles which must be intensely colored and electrically photosensitive and which apparently undergo a net change in charge polarity upon exposure to activating electromagnetic radiation, through interaction with one of the electrodes. Where particles of a single color are used, single colored images will be produced conforming to conventional black-and-white photography. Images may be produced in color where mixtures of two or more differently colored particles are used. Particles of each color are sensitive only to light of a specific wave-length or narrow range of wave-length thus permitting color separation.

Pigments used in the imaging particles for this system must have both intense pure colors and be highly photosensitive. The pigments of the prior art often lack the purity and brilliance of color, the high degree of photosensitivity, and/or the preferred correlation between the peak spectral response and peak photosensitivity necessary for use in such a system.

It is, therefore, an object of this invention to provide pigments which substantially overcome the above-noted deficiencies.

It is another object of this invention to provide electrophoretic imaging processes which overcome the above-noted deficiencies.

It is another object of this invention to provide new pigmented coating and molding compositions.

It is another object of this invention to provide novel pigments having superior resistance to thermal and chemical degradation.

It is still another object of this invention to provide pigments having superior electrical photosensitive characteristics.

It is another object of this invention to provide a multicolor particle mix capable of producing improved color images by electrophoresis.

It is still another object of this invention to provide novel polychromatic electrophoretic imaging systems.

SUMMARY OF THE INVENTION

The foregoing objects and others are accomplished in accordance with this invention, basically, by providing novel compositions and novel processes using said compositions, the compositions having the general formula:

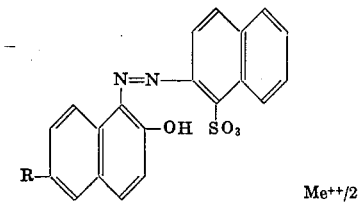

wherein:

R is selected from the group consisting of cyano and halogen radicals; and

Me is a divalent metal.

The compositions of the above general formula belong to the class of heavy metal salts of 6-halo or 6-cyano substituted 1 (1'-sulfo-2'-naphthylazo)-2-naphthols. These are generally produced from amino compounds by the process of diazotization and coupling. They are azo pigments derived from couplers obtained by condensing (6-halo or 6-cyano) 2-naphthols with 2-diazo-1-naphthalene sulfonic acid.

The compositions of the above general formula have in general the characteristics of intense magenta color and of substantial insolubility in the common organic solvents. These pigments may be dispersed in the usual paint and ink vehicles without dissolving excessively. Of the heavy metal ions, calcium, strontium, barium and manganese are preferred since they give the most desirable combination of insolubility and photosensitivity.

DESCRIPTION OF THE PREFERRED EMBODIMENTS

Of the compositions within the general formulas listed above the calcium salt of 6-bromo-1(1'-sulfo-2'-naphthylazo)-2-naphthol is preferred for use in electrophoretic imaging processes since it has especially pure magenta color and is most highly photosensitive. Since the shade or tone of the compositions and their spectral and photosensitive response vary slightly depending upon the substituents used, intermediate values of these variables may be obtained by mixing several of the different compositions.

The following examples further define methods of making the compositions of the present invention. Parts and percentages are by weight unless otherwise indicated. The examples below should be considered to illustrate various preferred embodiments of methods of preparing the pigments of the present invention.

EXAMPLE I

About 0.55 mole of 2-amino-1-naphthalene sulfonic acid (available from Distillation Products Industries, Inc.) is dissolved in about 1 liter of water containing about 27 grams sodium carbonate. This solution is poured into about 1 liter of 4 normal hydrochloric acid with rapid stirring. The suspension is cooled by adding about 700 grams of crushed ice and is diazotized by slowly running in about 35 grams of sodium nitrate in the form of a 30 percent solution cooled to about 5° C. The reaction mixture is stirred for about 1 hour. The suspension of diazonium salt thus obtained is purified by filtration. The soluble impurities are discarded and the filter cake consisting of relatively pure diazonium salt is suspended in about 1 liter of water.

A second solution is prepared by dissolving about 0.5 mole of 6-bromo-2-naphthol in about 500 milliliters of 8 percent sodium hydroxide solution. This solution is diluted with water to make a volume of about 1,500 milliliters.

The solution of 6-bromo-2-naphthol prepared above is then slowly run into the suspension of diazonium salt prepared above with vigorous stirring. The temperature is maintained at about 20° C. during the mixing of the two solutions. A bright red precipitate is obtained which is collected by filtration and washed with water.

The precipitate is then suspended in about 100 milliliters of water and the suspension is run into 1 liter of about 6 percent solution of calcium chloride in water. The mixture is stirred vigorously and heated to about 95° C. in about 1 hour. A bright magenta-colored solid is filtered off and washed thoroughly with water to remove ionic impurities. This product is a calcium lake of 6-bromo-1(1'-sulfo-2-naphthylazo)-2-naphthol.

The sensitivity of this pigment for use in electrophoretic imaging may be improved by further purification. A typical purification is as follows. About 1 part of the pigment is boiled in about 5 parts of pyridine and filtered. The pigment is washed once again with hot pyridine and then washed with methanol until the washings are free of pyridine. The pigment is dried at about 80° C. under vacuum for about 12 hours.

EXAMPLE II

A diazonium salt solution is prepared as in the first paragraph of Example I above. A second solution is prepared by dissolving about 0.5 mole of 6-cyano-2-naphthol in about 500 milliliters of 8 percent sodium hydroxide solution. This solution is then diluted with water to make a volume of about 1,500 milliliters.

The solution of 6-cyano-2-naphthol is then slowly poured into the suspension of diazonium salt with vigorous stirring. The temperature is maintained at about 20° C. during the addition. A magenta precipitate is obtained which is collected by filtration and washed with water. The pigment produced is a sodium salt of 6-cyano-1-(1'-sulfo-2-naphthylazo)-2-naphthol.

The sodium salt of the pigment thus prepared is suspended in about 100 parts of water and the suspension is poured into 1 liter of a 6 percent solution of barium chloride in water. The mixture is stirred vigorously and heated to about 100° C. for about 1 hour. A bright magenta colored solid is filtered off and washed thoroughly with water to remove ionic impurities. This product is the barium salt of 6-cyano-1(1'-sulfo-2-naphthylazo)-2-naphthol.

This pigment may be further purified by boiling about 1 part of the pigment in about 4 parts dimethyl formamide and filtering the mixture. The pigment is then washed again with dimethyl formamide and then washed with methanol until washings are free of dimethyl formamide. The pigment is then dried at about 70° C. under vacuum for about 12 hours.

The compositions of this invention are useful as pigments for coloring paints, varnishes, and other coating and molding compositions. For such uses, the pigment must generally be in finely powdered form. The particles may be reduced to a fine powder, for instance, by dispersing the material in a hydrocarbon liquid and ball milling for about 48 hours. In addition to the specific uses listed above, it has been found that the compositions of this invention may be dispersed in other natural and synthetic resins resulting in colored compositions suitable for coating and molding processes. Any suitable carrier resin may be used. Typical resins include balsam resins, phenol resins, phenol resins modified with colophony and other resins of which colophony constitutes a major part, coumarone resins and indene resins and the substances covered by the collective term "synthetic lacquer resins" which includes processed natural substances, such as cellulose ether; polymers such as polyvinylchlorides, polyvinylacetates, polyvinylacetals, polyvinyl ethers, polyacrylic and polymethacrylic esters, polystyrene and isobutylene; polycondensates, e.g., polyesters such as phthalate resins; alkyd resins, maleic acid resins, phenol formaldehyde resins, urea formaldehyde resins, melamine formaldehyde condensates, ketone resins, xylene formaldehyde resins, polyactams and polyamides; epoxy resins, polyadducts, such as polyurethanes and any suitable mixtures or copolymers thereof.

The compositions of this invention are further useful as pigments in paper making processes when a brightly magenta colored paper is desired. Pigments of this invention may also be dispersed in synthetic filament forming materials useful in the production of synthetic textiles. The electrically photosensitive characteristics of these compounds, i.e., their ability to hold an electrostatic charge in the dark and dissipate it in the light, makes them also useful in various electrophotographic imaging processes.

BRIEF DESCRIPTION OF THE DRAWING

The compositions of this invention have been found to be especially useful in electrophoretic imaging systems of the sort discussed above. An exemplary electrophoretic imaging system is schematically shown in the figure. This system is suitable for both monochromatic and polychromatic image formation.

Referring now to the figure, there is seen a transparent electrode generally designated 1 which, in this exemplary instance, is made up of a layer of optically transparent glass 2 overcoated with a thin optically transparent layer 3 of tin oxide, commercially available under the name NESA glass. This electrode will hereafter be referred to as the "injecting electrode". Coated on the surface of injecting electrode 1 is a thin layer 4 of finely divided photosensitive particles dispersed in an insulating carrier liquid. The term "photosensitive", for the purposes of this application, refers to the properties of a particle which, once attracted to the injecting electrode, will migrate away from it under the influence of an applied electric field when it is exposed to suitable actinic electromagnetic radiation. For a detailed theoretical explanation of the apparent mechanism of operation of the invention, see the above mentioned copending applications Ser. Nos. 384,737, now U.S. Pat. No. 3,384,565; 384,681, now abandoned, and 384,680, now abandoned, the disclosures of which are incorporated herein by reference. Liquid suspension 4 may also contain a sensitizer and/or a binder for the pigment particles which is at least partially soluble in the suspending carrier liquid. Adjacent to the liquid suspension 4 is a second electrode 5, hereafter called the "blocking electrode" which is connected to one side of the potential source 6 to a switch 7. The opposite side of potential source 6 is connected to the injecting electrode 1 so that when switch 7 is closed, an electric field is applied across the liquid suspension 4 between electrodes 1 and 5. An image projector made up of a light source 8, a transparency 9 and a lens 10 is provided to expose the dispersion 4 to a light image of the original transparency 9 to be reproduced. Electrode 5 is made in the form of a roller having a conductive central core 11 connected to the potential source 6. The core is covered with a layer of a blocking electrode material 12, which may be Baryta paper. The pigment suspension is exposed to the image to be reproduced while a potential is applied across the blocking and injecting electrodes by closing switch 7. Roller 5 is caused to roll across the top surface of injecting electrode 1 with switch 7 closed during the period of image exposure. This light exposure causes exposed pigment particles originally attracted to electrode 1 to migrate through the liquid and adhere to the surface of the blocking electrode, leaving behind a particulate image on the injecting electrode surface which is a duplicate of the original transparency 9. After exposure, the relatively volatile carrier liquid evaporates off, leaving behind the image. This particulate image may then be fixed in place as, for example, by placing a lamination over its top surface or by virtue of a dissolved binder material in the carrier liquid such as paraffin wax or other suitable binder that comes out of solution as the carrier liquid evaporates. The carrier liquid itself may be molten paraffin wax or other suitable binder. In the alternative, the pigment image remaining on the injecting electrode may be transferred to another surface and fixed thereon.

Any suitable insulating liquid may be used as the carrier for the pigment particles in the system. Typical carrier liquids are decane, dodecane, N-tetradecane, paraffin, beeswax or other thermoplastic materials, Sohio Odorless Solvent 3440, (a kerosene fraction available from the Standard Oil Company of Ohio), an Isopar–G, (a long chain saturated aliphatic hydrocarbon available from the Humble Oil Company of New Jersey). Good quality images have been produced with voltages ranging from about 300 to 7,000 volts in the apparatus of the figure.

In a monochromatic system, particles of a single color are dispersed in the carrier liquid and exposed to a black-and-white image. A single color image results, corresponding to conventional black-and-white photography. In a polychromatic system, the particles are selected so that those of different colors respond to different wave-lengths in the visible spectrum corresponding to their principal absorption bands. Also, the pigments should be selected so that their spectral response curves do not have substantial overlap, thus allowing for color separation and subtractive multicolor image formation. In a typical polychromatic system, the particle dispersion should include cyan colored particles sensitive mainly to red light, magenta particles sensitive mainly to green light and yellow particles sensitive mainly to blue light. When mixed together in a carrier liquid, these particles produce a black appearing liquid. When one or more of the particles are caused to migrate from base electrode 1 toward an upper electrode, they leave behind particles which produce a color equivalent to the color of the impinging light. Thus, for example, red light exposure causes the cyan color pigment to migrate, leaving behind the magenta and yellow pigments which combine to produce red in the final image. In the same manner, blue and green colors are reproduced by removal of yellow and magenta, respectively. When white light impinges upon the mix, all pigments migrate, leaving behind the color of the white for transparent substrate. No exposure leaves behind all pigments which combine to produce a black image. This is an ideal technique of subtractive color imaging in that the particles are not only each composed of a single component, but in addition, they perform the dual functions of final image color and photosensitive medium.

It has been found that the compounds of the general formula given above are surprisingly effective when used in either a single or multicolor electrophoretic imaging system. Their good spectral response and high photosensitivity result in dense, brilliant images. As disclosed in copending application Ser. No. 473,607, filed July 21, 1965, now abandoned, it has recently been discovered that many azo pigments passes electrical photosensitivity making them suitable for use in electrophoretic imaging systems. Many of the known azo pigments, however, are not suitable for subtractive polychromatic imaging where the particles should be magenta, yellow or cyan in color. Many of the so-called magenta pigments are, if fact, too red for high quality subtractive imaging. The pigments of the resent invention, however, have the highly desirable pure magenta color in addition to outstandingly high sensitivity.

Any suitable different colored photosensitive pigment particles having the desired spectral responses may be used with the pigments of this invention to form a particle mix in a carrier liquid for polychromatic imaging. From about 2 to about 10 percent pigment by weight in this suspension have been found to produce good results.

All of the following examples are carried out in an apparatus of the general type illustrated in the figure with the imaging mix 4 coated on a NESA glass substrate through which exposure is made. The NESA glass surface is connected in series with a switch, a potential source, and the conductive center of a roller having a coating of Baryta paper on its surface. The roller is approximately 2 and ½ inches in diameter and is moved across the plate surface at about 5 centimeters per second. The plate employed is roughly 4 inches square and is exposed with a light intensity of about 1,160 foot candles as measured on the uncoated NESA glass surface. Unless otherwise indicated, about 7 percent by weight of the indicated pigments in each example is suspended in Sohio Odorless Solvent 3440 in a magnitude of the applied potential is about 2,500 volts. All pigments which have a relatively large particle size as received commercially or is made are ground in a ball mill for about 48 hours to reduce their size to provide a more stable dispersion which improves the resolution of the final images. In each of the Examples III–X, the exposure is made with a 3,200° K. lamp through a 0.30 neutral density step wedge filter to measure the sensitivity of the suspensions to white light and then Wratten filters 29, 61 and 47b are individually superimposed over the light source in separate tests to measure the sensitivity of the suspensions to red, green and the blue light, respectively.

EXAMPLE III

About 7 parts of the calcium salt of 6-bromo-1(1'-sulfo-2'-naphthylazo)-2-naphthol is suspended in about 100 parts Sohio Odorless Solvent 3440. The mixture is coated onto the injecting electrode and a negative potential is imposed on the blocking electrode. The plate is exposed through a Wratten 29 filter and the neutral density step wedge filter, thus exposing the plate to red light. The results are tabulated in Table I below.

EXAMPLE IV

The experiment of Example III is repeated with another suspension of about 7 parts of the calcium salt of 6-bromo-1(1'-sulfo-2-naphthylazo)-2-naphthol in about 100 parts Sohio Odorless Solvent 3440; except that a Wratten 61 filter is used in place of the Wratten 29 filter. Thus, the plate is exposed to green light only. As can be seen from Table I, this pigment is highly sensitive to green light, as is preferred with a magenta pigment.

EXAMPLE V

The experiment of Example IV is repeated, with a Wratten 47b filter in place of the Wratten 61 filter, thus exposing the plate to blue light only. As indicated in Table I, this pigment has low, but significant, sensitivity to blue light.

EXAMPLE VI

The experiment of Example V is repeated, with no colored filter between the light source and the plate, thus exposing the plate to white light. This pigment has very high sensitivity to white light, as shown in Table I, thus indicating suitability for monochromatic as well as polychromatic imaging.

EXAMPLE VII

A sample of the calcium salt of 6-bromo-1(1'-sulfo-2-naphthylazo)-2-naphthol prepared as described in Example I above, is treated by being maintained in pyridine at the reflux temperature, about 117° C. for about 30 minutes. About 7 parts of the treated material is then suspended in about 100 parts Sohio Odorless Solvent 3440. The suspension is coated onto a NESA injecting electrode and imaged as described above. A Wratten 29 filter and a neutral density step-wedge filter are placed between the light source and the plate to test the sensitivity of the suspension to red light. As indicated in Table I, this pigment is not sensitive to red light.

EXAMPLE VIII

The experiment of Example VII is repeated, using a Wratten 61 filter in place of the Wratten 29 filter so as to expose the plate to green light only. As shown by Table I, this treated pigment is highly sensitive to green light; in fact more sensitive than the untreated pigment tested in Example IV.

EXAMPLE IX

The experiment of Example VIII is repeated using a Wratten 47b filter in place of the Wratten 61 filter to expose the plate to blue light only. As shown by Table I, the pigment is less sensitive to blue light than to green.

EXAMPLE X

The experiment of Example IX is repeated with no colored filter between the light source and the plate so that the plate is exposed to white light. As Table I shows, the treated pigment has the highest sensitivity to white light.

TABLE I

|  | Roller potential | Wratten filter | Light color | Speed. fc. | Gamma | $D_{max}$ | $D_{min}$ |
|---|---|---|---|---|---|---|---|
| Example: |  |  |  |  |  |  |  |
| III | −3,000 | 29 | Red | (¹) | 2.5 | 1.6 | 0.35 |
| IV | −3,000 | 61 | Green | 30 | 2.5 | 1.6 | 0.35 |
| V | −3,000 | 47b | Blue | 120 | 2.5 | 1.6 | 0.35 |
| VI | −3,000 | (¹) | White | 15 | 2.5 | 1.6 | 0.35 |
| VII | −3,000 | 29 | Red | (¹) | 3.0 | 1.5 | 0.1 |
| VIII | −3,000 | 61 | Green | 15 | 3.0 | 1.5 | 0.1 |
| IX | −3,000 | 47b | Blue | 60 | 3.0 | 1.5 | 0.1 |
| X | −3,000 | (¹) | White | 8 | 3.0 | 1.5 | 0.1 |

¹ None.

The electrophoretic sensitivity of the various pigments to red, green, blue and white light is tested according to conventional photographic methods and the results are recorded in Table I, above. In the Table, the first column lists the number of the test example. The second column gives a positive or negative electrical potential applied to the roller electrode in volts. The Wratten filters used in each example between the light source and the NESA plate are listed in column 3. The fourth column lists the color of the light which is permitted to fall on the NESA plate. The fifth column gives the photographic speed of the photosensitive mix in foot candles. The photographic speed is the result of a curve of optical density plotted against the logarithim of exposure in foot candles. Gamma, as listed in column six, is a standard photographic term referring to the slope of the above mentioned curve and indicates image density. The maximum and minimum reflection density produced are listed in columns seven and eight, respectively.

In each of the Examples XI–XIII below, a suspension including equal amounts of three different color pigments is made up by dispersing the pigments in finely divided form in Sohio Odorless Solvent 3440 so that the pigments constitute about 8 percent by weight of the mixture. This mixture may be referred to as a "tri-mix". These mixtures are individually tested by coating them on a NESA glass and exposing them as in Example I above, except that a multicolor "Kodachrome" transparency is interposed between the light source and the plate instead of the neutral density and Wratten filters. Thus, a multicolor image is projected onto the plate as the roller moves across the surface of the coated piece of glass substrate. A Baryta paper blocking electrode is employed and the roller is held at a negative potential of about 2,500 volts with respect to the substrate. The roller is passed over the substrate six times, being cleaned after each pass. The potential application and exposure are both continued during the entire period of the six passes by the roller. After completion of the six passes, the quality of the image left on the substrate is evaluated as to density and color separation.

EXAMPLE XI

The tri-mix comprises equal parts of a cyan pigment, Monolite Fast Blue GS, the alpha-form of metal-free phthalocyanine, available from the Arnold Hoffman Company; a yellow pigment, Algol Yellow GC, C.I. No. 67, 300, 1,2,5,6-di(C,C'-diphenyl)-thiazole-anthraquinone, available from General Dyestuffs; and a magneta pigment, the calcium salt of 6-bromo-1('-sulfo-2'-naphthylazo)-2-naphthol, prepared as described above. About 8 parts of this tri-mix is suspended in about 100 parts of Sohio Odorless Solvent 3440 and exposed to a full color original as described above. A full color image of excellent quality conforming to the original having excellent color balance and density is produced on the injecting electrode surface.

EXAMPLE XII

The tri-mix comprises a cyan pigment, Cyan GTNF, the beta form of copper phthalocyanine, C.I. No. 74,160, available from the Collway Color Company, a yellow pigment, N-2''-pyridyl-8,13-dioxodinaphtho-(1,2–2',3')-furan-6-carboxamide, prepared as described in copending application Ser. No. 421,281, filed Dec. 28, 1964, and a magenta pigment the barium salt of 6-cyano-1(1'-sulfo-2'-naphthylazo)-2-naphthol, prepared as described above. About 8 parts of this tri-mix is dispersed in about 100 parts Isopar-G. This suspension is exposed to a natural color original as described above. A full color image is produced on the injecting electrode of good quality.

EXAMPLE XIII

The tri-mix comprises a magenta pigment, the strontium salt of 6-chloro-1(1'-sulfo-2'-naphthylazo)-2-naphthol, prepared as described above; a yellow pigment, 8,13-dioxodi-naphtho-(1,2–2',3')-furan-6-carbox-(3''-cyano-5''-methoxy) anilide, prepared as described in copending application Ser. No. 421,377, filed Dec. 28, 1964, now U.S. Pat. No. 3,448,565, and a cyan pigment, the x-form of metal-free phthalocyanine, prepared as described in copending application Ser. No. 505,723, filed Oct. 29, 1965, now U.S. Pat. No. 3,357,989. A suspension is formed and exposed to a full-color original as described above. A full color image of good quality, conforming to the original is produced on the injecting electrode.

Although specific components and proportions have been described in the above examples relating to methods of preparing the pigments of this invention and to methods of using these pigments in coating and molding compositions and in electrophoretic imaging systems, other suitable materials as listed above, may be used with similar results. In addition, other materials may be added to the pigment compositions to synergize, enhance, or otherwise modify their properties. For example, the pigment compositions of this invention may be electrically or dye sensitized, if desired, or may be mixed or otherwise combined with other photosensitive materials, both organic and inorganic.

Other modifications and ramifications of the present invention will occur to those skilled in the art upon a reading of the present disclosure. These are intended to be included within the scope of this invention.

What is claimed is:

1. The method of electrophoretic imaging comprising subjecting a layer of a suspension to an applied electric field between at least a pair of electrodes, at least one of which is at least partially transparent, and exposing said suspension to an image through said transparent electrode with activating electromagnetic radiation whereby an image made up of migrated particles is formed on at least one of said electrodes; said suspension comprising a plurality of finely divided particles of at least one color, the particles of one color comprising a photosensitive pigment having the general formula:

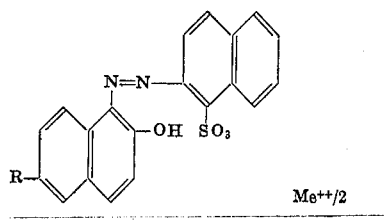

wherein:
R is selected from the group consisting of cyano and halogen radicals; and
Me is a divalent heavy metal.

2. The method of claim 1 wherein said photosensitive pigment is a divalent heavy metal salt of 6-bromo-1(1'-sulfo-2'-naphthylazo)-2-naphthol.

3. The method of claim 2 wherein said metal is selected from the group consisting of calcium, strontium, barium and manganese.

4. The method of claim 2 wherein said metal is calcium.

5. The method of claim 1 wherein said photosensitive pigment is treated with pyridine before said suspension is formed.

6. The method of claim 1 wherein one of said electrodes is a blocking electrode.

7. The method of electrophoretic imaging comprising subjecting a layer of a suspension to an applied electric field between a pair of electrodes, at least one of which is at least partially transparent, said suspension comprising a plurality of finely divided particles of at least two different colors in a carrier liquid, the particles of each color comprising a photosensitive pigment whose principal light absorption band substantially coincides with its principal photosensitive response band, simultaneously exposing said suspension to a polychromatic light image through said partially transparent electrode and then separating said electrodes whereby a polychromatic migrated particle image is formed on the surface of at least one of said electrodes; the particles of one color comprising compositions having the general formula:

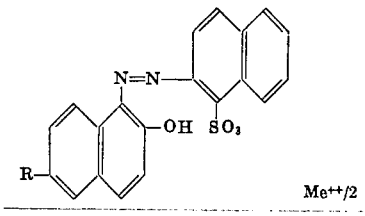

wherein:
R is selected from the group consisting of cyano and halogen radicals; and
Me is a divalent heavy metal.

8. The method of claim 7 wherein said photosensitive pigment is a divalent heavy metal salt of 6-bromo-1(1'-sulfo-2'-naphthylazo)-2-naphthol.

9. The method of claim 7 wherein said metal is selected from the group consisting of calcium, strontium, barium and manganese.

10. The method of claim 9 wherein said metal is calcium.

11. The method of claim 7 wherein said photosensitive pigment is treated with pyridine before said suspension is formed.

* * * * *